United States Patent
Xiang et al.

(10) Patent No.: US 12,488,481 B2
(45) Date of Patent: Dec. 2, 2025

(54) VIDEO RECONSTRUCTION FROM VIDEOS WITH ULTRA-LOW FRAME-PER-SECOND

(71) Applicant: Meta Platforms, Inc., Menlo Park, CA (US)

(72) Inventors: Xiaoyu Xiang, Santa Clara, CA (US); Ingrid Anda Cotoros, Hillsborough, CA (US); Rakesh Ranjan, Sunnyvale, CA (US); Vikas Chandra, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 424 days.

(21) Appl. No.: 17/887,034

(22) Filed: Aug. 12, 2022

(65) Prior Publication Data

US 2024/0054664 A1    Feb. 15, 2024

(51) Int. Cl.
*G06T 7/38* (2017.01)
*G06T 7/33* (2017.01)
*G06V 10/80* (2022.01)

(52) U.S. Cl.
CPC .......... *G06T 7/38* (2017.01); *G06T 7/33* (2017.01); *G06V 10/806* (2022.01); *G06T 2207/10016* (2013.01)

(58) Field of Classification Search
CPC ... G06T 7/38; G06T 7/33; G06T 2207/10016; G06T 3/4007; G06V 10/806; H04N 23/951; H04N 7/0127
See application file for complete search history.

(56) References Cited

U.S. PATENT DOCUMENTS

| 7,817,180 B2 * | 10/2010 | Jeong ............... H04N 7/152 348/14.08 |
| 8,660,175 B2 | 2/2014 | Dane et al. |
| 2019/0045213 A1 * | 2/2019 | Raut ............... H04N 19/17 |
| 2021/0064925 A1 * | 3/2021 | Shih ............... G06N 3/084 |
| 2021/0067735 A1 * | 3/2021 | Reda ............... G06N 3/045 |
| 2021/0329306 A1 * | 10/2021 | Liu ............... G06V 40/168 |

(Continued)

FOREIGN PATENT DOCUMENTS

WO    WO-2022096158 A1 *    5/2022    ........... H04N 19/597

OTHER PUBLICATIONS

European Search Report for European Patent Application No. 23189323.1, dated Jan. 29, 2024, 8 pages.

(Continued)

*Primary Examiner* — Oneal R Mistry
*Assistant Examiner* — Jongbong Nah
(74) *Attorney, Agent, or Firm* — Seyfarth Shaw LLP (57) ABSTRACT

In one embodiment, a method includes accessing a video captured by cameras which is associated with a first framerate lower than a threshold framerate, for any two adjacent frames of the accessed video: generating a warped frame from the two adjacent frames based on an optical flow associated with the two adjacent frames, determining alignments for the two adjacent frames, respectively, fusing the determined alignments for the two adjacent frames, and generating a reconstructed frame based on the fused alignment, and reconstructing the accessed video based on the any two adjacent frames and their respective reconstructed frames, wherein the reconstructed video is associated with a second framerate higher than the threshold framerate.

19 Claims, 7 Drawing Sheets

(56) References Cited

U.S. PATENT DOCUMENTS

| | | | |
|---|---|---|---|
| 2022/0070477 A1* | 3/2022 | Jiang | G06N 3/084 |
| 2022/0210402 A1* | 6/2022 | Li | H04N 19/577 |
| 2022/0400226 A1* | 12/2022 | Liang | H04N 7/0145 |

OTHER PUBLICATIONS

Parihar A.S., et al., "A Comprehensive Survey on Video Frame Interpolation Techniques," Visual Computer, Jan. 4, 2021, vol. 38, No. 1, pp. 295-319.

Bao W., et al., "MEMC-Net: Motion Estimation and Motion Compensation Driven Neural Network for Video Interpolation and Enhancement," IEEE Transactions on Pattern Analysis and machine Intelligence, arXiv:1810.08768v2 [cs.CV], Sep. 5, 2019, 16 pages.

Chan K.C.K., et al., "BasicVSR++: Improving Video Super-Resolution with Enhanced Propagation and Alignment," arXiv:2104.13371v1, Apr. 27, 2021, 12 pages.

Jiang B., et al., "Consistent WCE Video Frame Interpolation Based on Endoscopy Image Motion Estimation," IEEE 18th International Symposium on Biomedical Imaging (ISBI), Apr. 16, 2021, pp. 334-338.

Ukihashi K., et al., "Improving Global Motion Compensation for Frame Interpolation with High-Resolution and High-Frame-Rate Video," SASIMI 2019 Proceedings, 2019, pp. 27-32.

\* cited by examiner

100
VIDEO RECONSTRUCTION FROM VIDEOS WITH ULTRA-LOW FRAME-PER-SECOND

TECHNICAL FIELD

This disclosure generally relates to video streaming within network environments, and in particular relates to hardware and software for video reconstruction.

BACKGROUND

Streaming media is multimedia that is delivered and consumed in a continuous manner from a source, with little or no intermediate storage in network elements. There are challenges with streaming content on the Internet. For example, users whose Internet connection lacks sufficient bandwidth may experience stops, lags, or poor buffering of the content, and users lacking compatible hardware or software systems may be unable to stream certain content. Livestreaming is the real-time delivery of content during production. Livestreaming requires a form of source media (e.g., a video camera, an audio interface, screen capture software), an encoder to digitize the content, a media publisher, and a content delivery network to distribute and deliver the content. Streaming is most prevalent in video on demand and streaming television services. Other services stream music. Video game live streaming uses streaming for online gaming.

Video reconstruction is the process of generating high-resolution video frames from the given low-resolution ones. The main goal is not only to restore more fine details while saving coarse ones, but also to preserve motion consistency. Motion interpolation or motion-compensated frame interpolation is a form of video processing in which intermediate animation frames are generated between existing ones by means of interpolation, in an attempt to make animation more fluid, to compensate for display motion blur, and for fake slow motion effects.

SUMMARY OF PARTICULAR EMBODIMENTS

In particular embodiments, a computing system may reduce the power consumption of the camera by having the camera capture videos at a lower framerate and transmit the captured video to a receiver computer and then reconstructing the captured video to a required higher framerate at the receiver computer with efficient video interpolation algorithms. The video frame interpolation algorithms may take a sequence of frames as input and synthesize one or several frames in the middle of every two adjacent frames. The video frame interpolation algorithms may further combine the synthesized frames with the original adjacent frames following their temporal order for completing the reconstruction of the video at higher framerate. Based on the embodiments disclosed herein, the burden of imaging, compression, and transmission of the camera may be re-assigned as the computation burden on the receiver computer, which may save not only the battery life of the camera but also the bandwidth for transmitting the captured videos. Although this disclosure describes reconstructing particular videos by particular systems in a particular manner, this disclosure contemplates reconstructing any suitable video by any suitable system in any suitable manner.

In particular embodiment, the receiver computer may access a video captured by one or more cameras. The video may be associated with a first framerate lower than a threshold framerate. For any two adjacent frames of the accessed video, the receiver computer may perform the following steps. In particular embodiments, the receiver computer may generate a warped frame from the two adjacent frames based on an optical flow associated with the two adjacent frames. The receiver computer may then determine alignments for the two adjacent frames, respectively. The receiver computer may then fuse the determined alignments for the two adjacent frames. The receiver computer may further generate a reconstructed frame based on the fused alignment. In particular embodiments, the receiver computer may further reconstruct the accessed video based on the any two adjacent frames and their respective reconstructed frames. The reconstructed video may be associated with a second framerate higher than the threshold framerate.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system may reduce the power consumption of the camera by having the camera capture videos at a lower framerate and transmit the captured video to a receiver computer and then reconstructing the captured video to a required higher framerate at the receiver computer with efficient video interpolation algorithms. The video frame interpolation algorithms may take a sequence of frames as input and synthesize one or several frames in the middle of every two adjacent frames. The video frame interpolation algorithms may further combine the synthesized frames with the original adjacent frames following their temporal order for completing the reconstruction of the video at higher framerate. Based on the embodiments disclosed herein, the burden of imaging, compression, and transmission of the camera may be re-assigned as the computation burden on the receiver computer, which may save not only the battery life of the camera but also the bandwidth for transmitting the captured videos. Although this disclosure describes reconstructing particular videos by particular systems in a particular manner, this disclosure contemplates reconstructing any suitable video by any suitable system in any suitable manner.

In particular embodiment, the receiver computer may access a video captured by one or more cameras. The video may be associated with a first framerate lower than a threshold framerate. For any two adjacent frames of the accessed video, the receiver computer may perform the following steps. In particular embodiments, the receiver computer may generate a warped frame from the two adjacent frames based on an optical flow associated with the two adjacent frames. The receiver computer may then determine alignments for the two adjacent frames, respectively. The receiver computer may then fuse the determined alignments for the two adjacent frames. The receiver computer may further generate a reconstructed frame based on the fused alignment. In particular embodiments, the receiver computer may further reconstruct the accessed video based on the any two adjacent frames and their respective reconstructed frames. The reconstructed video may be associated with a second framerate higher than the threshold framerate.

Capturing and streaming high-quality videos (e.g., at 60 fps) may consume a considerable amount of power, which may be not desirable for compact devices such as smart watch and AR glasses. On the other hand, streaming high-quality videos may also require a lot of bandwidth, which may be challenging for wireless transmission. To reduce the power consumption of the camera of the compact devices and the bandwidth for transmission, we may capture videos at a significantly lower framerate (e.g., 8-10 fps instead of 60 fps). After capturing the video, the camera may send the captured video data to the video receiver computer via wireless transmission. After receiving the video data, the receiver computer may use video frame interpolation algorithms to reconstruct the low-framerate videos to the required high framerate. The embodiments disclosed herein may be used for power-efficient filming to reconstruct normal-speed videos from extra low framerate per second where the motion may be quite discontinuous. The embodiments disclosed herein may be also used for slow-motion mode to turn common videos to ultra-high framerate per second.

Traditional methods of increasing framerate may assume that the motion is continuous, and all of the information can be obtained from such motion. These methods may just interpolate information in between according to the corresponding pixels. By contrast, the embodiments disclosed herein focus on a different problem where there is significant frame dropping (to achieve ultra-low framerate) on the sender side, e.g., the camera capturing the video, and video reconstruction on the receiver computer side, e.g., a remote server. As an example and not by way of limitation, a particular challenge may be that there could be bigger motion discontinuity when there are only a few frames. Some of the traditional methods may be useful for reconstructing a video from extra low framerate video but they have several limitations, including long and complex processing pipelines, models of large size, and being not suitable for extra-long framerate interpolations. By contrast, the embodiments disclosed herein may compose an efficient and lightweight method for video interpolation while handling motions in extra-long framerate resolution.

Based on the embodiments disclosed herein, a camera may be able to record video at a very low framerate to save the power for image signal processor, data compression and transmission. In particular embodiments, accessing the video captured by the one or more cameras may comprise receiving, via a wireless network, the video transmitted from the one or more cameras. The bandwidth needed for transmission of the captured video may be also lower than normal. In other words, the wireless network may be associated with a bandwidth lower than a threshold bandwidth. As an example and not by way of limitation, the camera may record at 15 fps. During the interval between two frames, the exposure window may be short or as long as about $\frac{1}{15}$ seconds. The long exposure ones may look blurry, but the camera may also record more motion information during the interval. The receiver computer may restore the low-framerate video into the target framerate with video interpolation algorithms. For short-exposure inputs, the video interpolation algorithms may just estimate the motion between the input frames. For long-exposure inputs, the video interpolation algorithms may decode the motion blur frame into a sequence of frames. With a sequence of such frames, the receiver computer may recover clean frames out of it. Since the receiver computer does not need to hallucinate motion from the long-exposure inputs, the reconstruction results may be better than the short-exposure ones.

Figure 1:
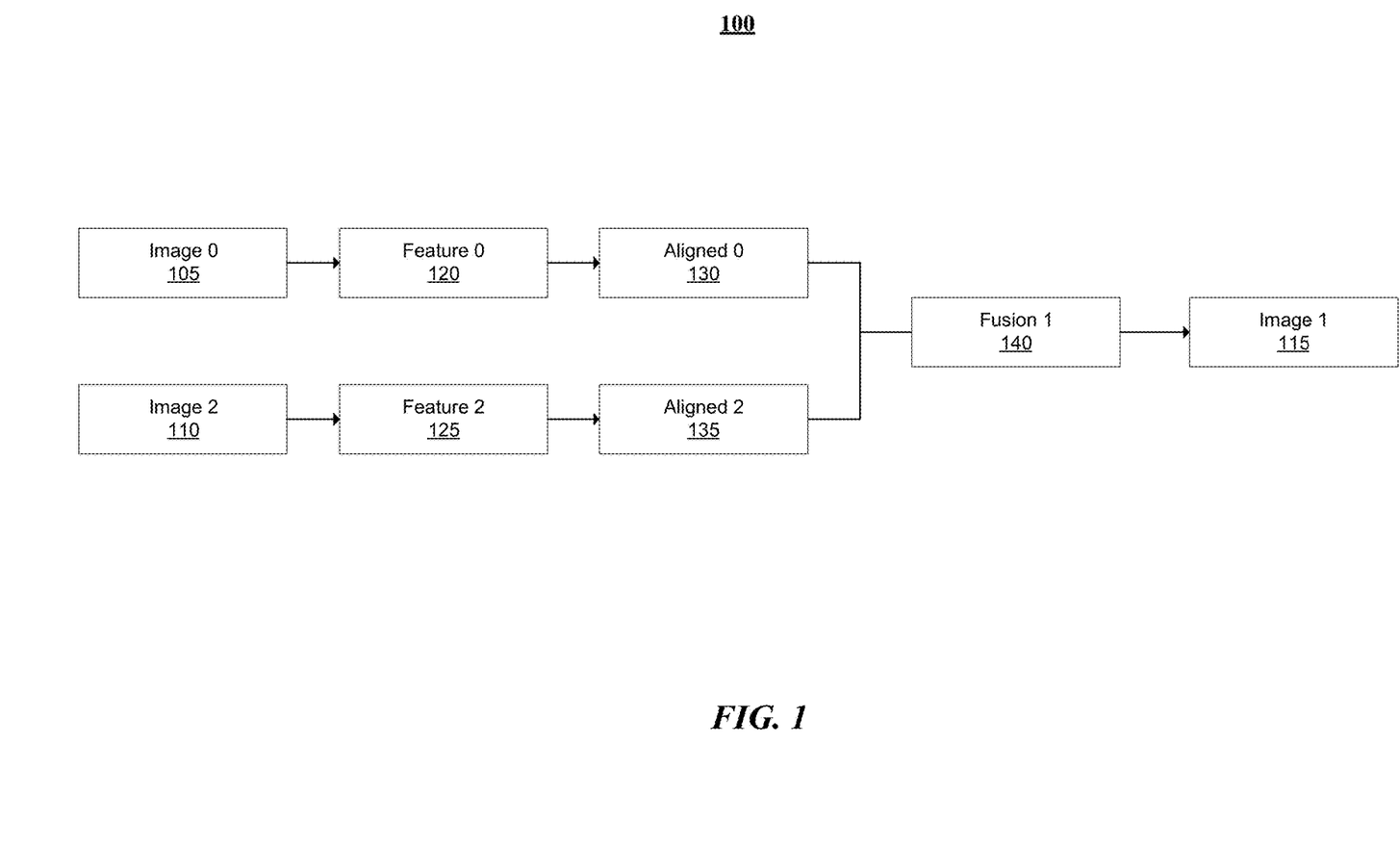
FIG. 1 illustrates an example pipeline of video frame interpolation.

FIG. 1 illustrates an example pipeline 100 of video frame interpolation. Take two adjacent frames denoted by image 0 105 and image 2 110 as an example, the goal of the pipeline 100 may be generating the frame (denoted by image 1 115) in between these two frames. In particular embodiments, the receiver computer may extract features for the any two adjacent frames. Determining the alignments for the any two adjacent frames may be based on the extracted features. The receiver computer may further generate, based on the extracted features for the any two adjacent frames by a warping algorithm, features for their reconstructed frame. As illustrated in FIG. 1, the receiver computer may first extract features, denoted by feature 0 120 and feature 2 125, for image 0 and image 2. The receiver computer may additionally generate a warped image based on image 0 105 and image 2 110 via the optical flow from these images. The warped image may be considered as an approximation of what the frame between these two adjacent frames could look like. However, the warped image may have holes/inaccuracies.

In particular embodiments, the receiver computer may then use the features of image 0 and image 2 to align these images in the feature space. The goal of the alignment may be to determine new position or motion action of the pixels in image 0 105 and image 2 110. As an example and not by way of limitation, the alignment may help determine how to place a moving object depicted in image 0 105 and image 2 110 to the correct position in image 1 115. In particular embodiments, the any two adjacent frames may each depict one or more moving objects. Accordingly, determining the alignments for the any two adjacent frames may comprise determining one or more respective placements for the one or more moving objects in their reconstructed frame. For alignment, the receiver computer may estimate forward flow and backward flow, back-propagate motions, and find the back projection to fit flow from image 0 105 to image 1 115 and from image 1 115 to image 2 110. The receiver computer may further refine the flow to generate a better alignment. With these techniques, the alignment may handle not only the movement of the object in the video but also the environment changes. In particular embodiments, the any two adjacent frames may be associated with a first movement associated with the one or more cameras. Determining the alignments for the any two adjacent frames may comprise determining a second movement associated with the one or more cameras. Accordingly, the alignments may be based on the second movement. As an example and not by way of limitation, if the video is captured by a head-mounted device (e.g., AR glasses), there may be head motion associated with the video and the alignment may help determine new positions or motion actions of pixels under the influence of head motion.

After the alignment, we may have the aligned feature for image 0 (denoted by aligned 0 130) and aligned feature for image 1 (denoted by aligned 1 135). The receiver computer may further fuse the aligned feature for image 0 105 and aligned feature for image 1 115 to obtain a fused feature (denoted by fusion 1 140). In particular embodiment, the receiver computer may fuse the determined alignments for the any two adjacent frames based on contextual information, thereby ensuring feature 0 120, fusion 1 140, and feature 2 125 are temporally smoothed.

In particular embodiments, fusion 1 140 may be then used to generate an intermediate image. The intermediate image may have residual information. In other words, each pixel of this image may indicate a residual. The receiver computer may further add the warped image which has pixel information (e.g., based on RGB channels) to the intermediate image to generate the reconstructed image 1 115. In particular embodiments, the receiver computer may add the warped frame associated with the any two adjacent frames to their reconstructed frame. In alternative embodiments, the receiver computer may just add an overlay associated with the any two adjacent frames to their reconstructed frame, e.g., adding an overlay of image 0 105 and image 1 110. In alternative embodiments, the receiver computer may add one of the any two adjacent frames to their reconstructed frame, e.g., just one image of image 0 105 and image 1 110 to the intermediate image to generate the reconstructed image 1 115.

Figure 2:
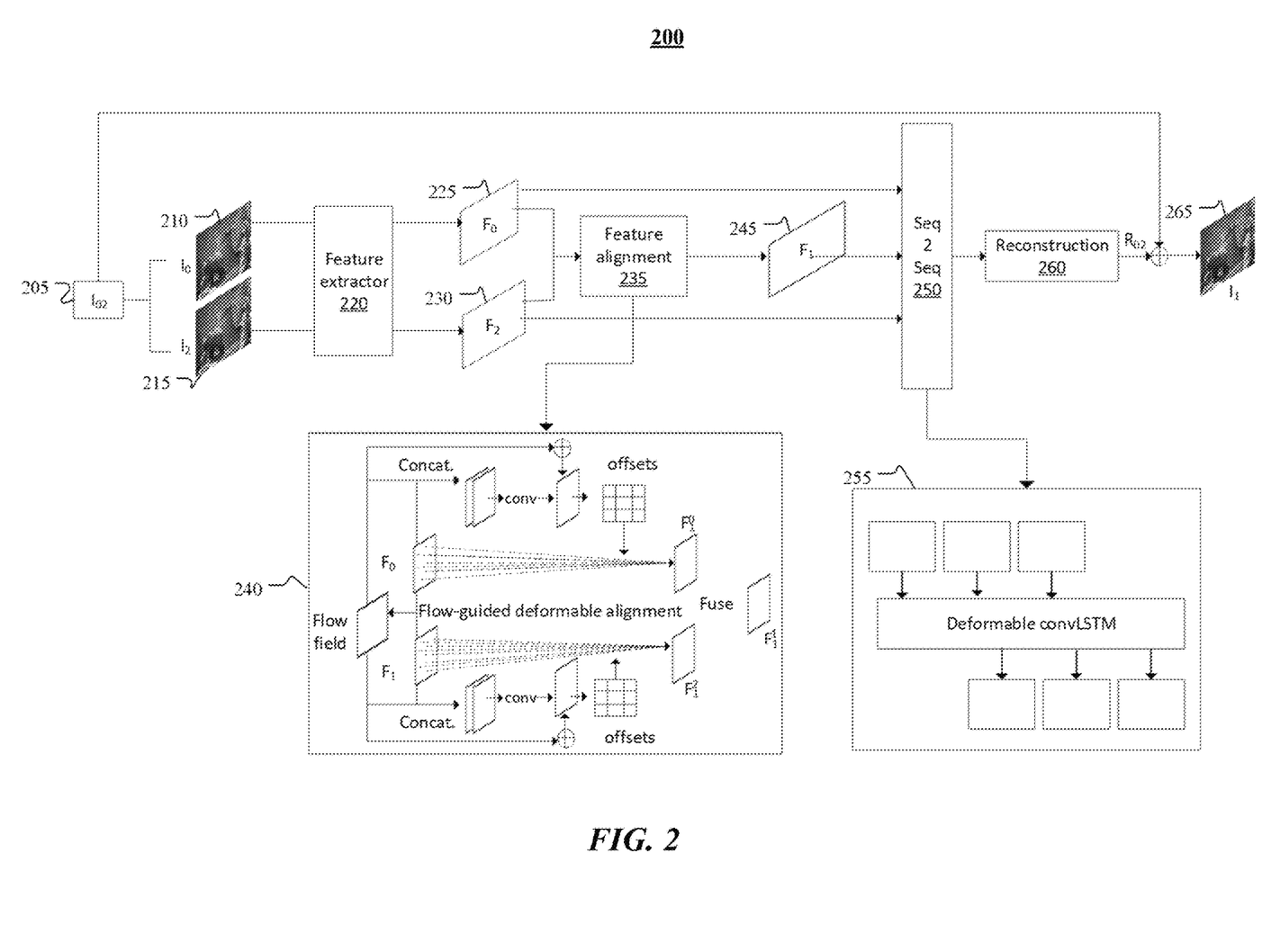
FIG. 2 illustrates an example architecture for video frame interpolation.

FIG. 2 illustrates an example architecture 200 for video frame interpolation. In particular embodiments, the any two adjacent frames may comprise a first frame and a second frame. Correspondingly, generating the warped frame may comprise the following steps. The receiver computer may first determine a forward optical flow from the first frame to the second frame and a backward optical flow from the second frame to the first frame. The receiver computer may then determine an intermediate optical flow at a predetermined time interval. The receiver computer may then determine, based on splatting, a first reverse optical flow from the reconstructed frame to the first frame and a second reverse optical flow from the second frame to the reconstructed frame. The receiver computer may then warp the first frame to the predetermined time interval based on the first reverse optical flow and the second frame to the predetermined time interval based on the second reverse optical flow. The receiver computer may further generate the warped frame by fusing the warped first frame and the warped second frame.

As illustrated in FIG. 2, $I_{02}$ 205 denotes the intermediate frame between two adjacent frames $I_0$ 210 and $I_2$ 215. In particular embodiments, $I_{02}$ 205 may be acquired from simple processing of $I_0$ and $I_2$. As an example and not by way of limitation, the receiver computer may calculate the forward optical flow $F_{02}$ and backward optical flow $F_{20}$ between $I_0$ 210 and $I_2$ 215. The receiver computer may then get the intermediate optical flow $F_{01}$ and $F_{21}$ at time interval 1. The receiver computer may then use splatting to get the corresponding reverse flow $F_{10}$ and $F_{12}$, and use them to warp $I_0$ 210 and $I_2$ 215 to the interval 1, respectively. In particular embodiments, the receiver computer may fuse the two acquired results to get $I_{02}$ 205. Besides the above warping methods, $I_{02}$ 205 may also be acquired by some naïve ways like simply averaging $I_0$ 210 and $I_2$ 215, or just take either $I_0$ 210 or $I_2$ 210. For the whole process of video frame interpolation, the optical flow may be only computed once.

In particular embodiments, a feature extractor 220 may extract features for $I_0$ 210 and $I_2$ 215, denoted by $F_0$ 225 and $F_2$ 230, respectively. The receiver computer may then perform feature alignment 235 based on $F_0$ 225 and $F_2$ 230. In particular embodiments, determining the alignments for the any two adjacent frames may comprise the following steps. The receiver computer may compute an offset field by concatenating the optical flow to the extracted features. The receiver computer may then generate a refined offset field by adding the computed offset field to a flow field associated with the extracted features. The receiver computer may then determine correspondences between the any two adjacent frames in both forward and backward directions. The receiver computer may further convolve locations corresponding to the correspondences based on the refined offset field.

With respect to FIG. 2, the detailed process 240 of feature alignment 235 may be as follows. The optical flow, denoted by flow field, may be already computed in the previous stage. The receiver computer may perform flow-guided deformable alignment by using a deformable convolution to find the correspondences between $I_0$ 210 and $I_2$ 215 in both forward and backward directions. In particular embodiments, the deformable convolution may calculate an offset field (denoted as offset) and then convolve the corresponding locations. Optical flow (i.e., flow field) may be concatenated to the two features $F_0$ 225 and $F_2$ 230 to compute the offset fields (i.e., offsets). In particular embodiments, the computed offset fields may be added to the flow field to get a refined offset estimation. After deformable convolution, we may get two aligned features: $F_0^1$ and $F_2^1$ from $I_0$ 210 and $I_2$ 215, respectively. Then we may use a 1×1 convolution to fuse them into the interval feature $F_1^1$.

In particular embodiments, the estimated interval feature $F_1^1$ and the extracted features $F_0$ 225 and $F_2$ 230 may form into a sequence $F_1$ 245. The receiver computer may pass the sequence $F_1$ 245 to a sequence-to-sequence (seq2seq) translation module 250. As an example and not by way of limitation, the sequence-to-sequence (seq2seq) translation module 250 may be a deformable convolution-LSTM (convLSTM) module 255. In this way, the features may become more uniform/harmonic after such recurrent propagation. Although disclosure describes the sequence-to-sequence (seq2seq) translation module as a deformable convolution-LSTM module, this disclosure contemplates any suitable module for the sequence-to-sequence (seq2seq) translation module such as simple recurrent neural networks, general encoder-decoder structure, or other propagation methods.

In particular embodiments, the output of the sequence-to-sequence translation module 250 may be used for reconstruction 260. The reconstruction 260 may be based on a sequence of convolution layers. In particular embodiments, the reconstruction 260 may be based on any suitable neural network structure, such as U-net, a sequential residual blocks, etc. The structure may comprise stacked convolution layers.

In particular embodiments, $I_{O2}$ 205 may be added to the reconstruction output $R_{O2}$ to get the final output $I_1$ 265, i.e., $I_1=I_{O2}+R_{O2}$. The reason for this may be as follows. When just relying on optical flow, there may be a few shortcomings. For example, we may not be able to find the correspondence points due to occlusion or divergence of the optical flow. As another example, there may be large holes and it may be discontinuous. As such, the reconstructed video may be not visually pleasing. In particular embodiments, $I_{O2}$ 205 may be used as an initialization or a baseline and be returned from the architecture 200 into patching the holes or refining the details so that we may generate better reconstruction. Furthermore, this may make optimization of the whole architecture 200 easier.

Figure 3:
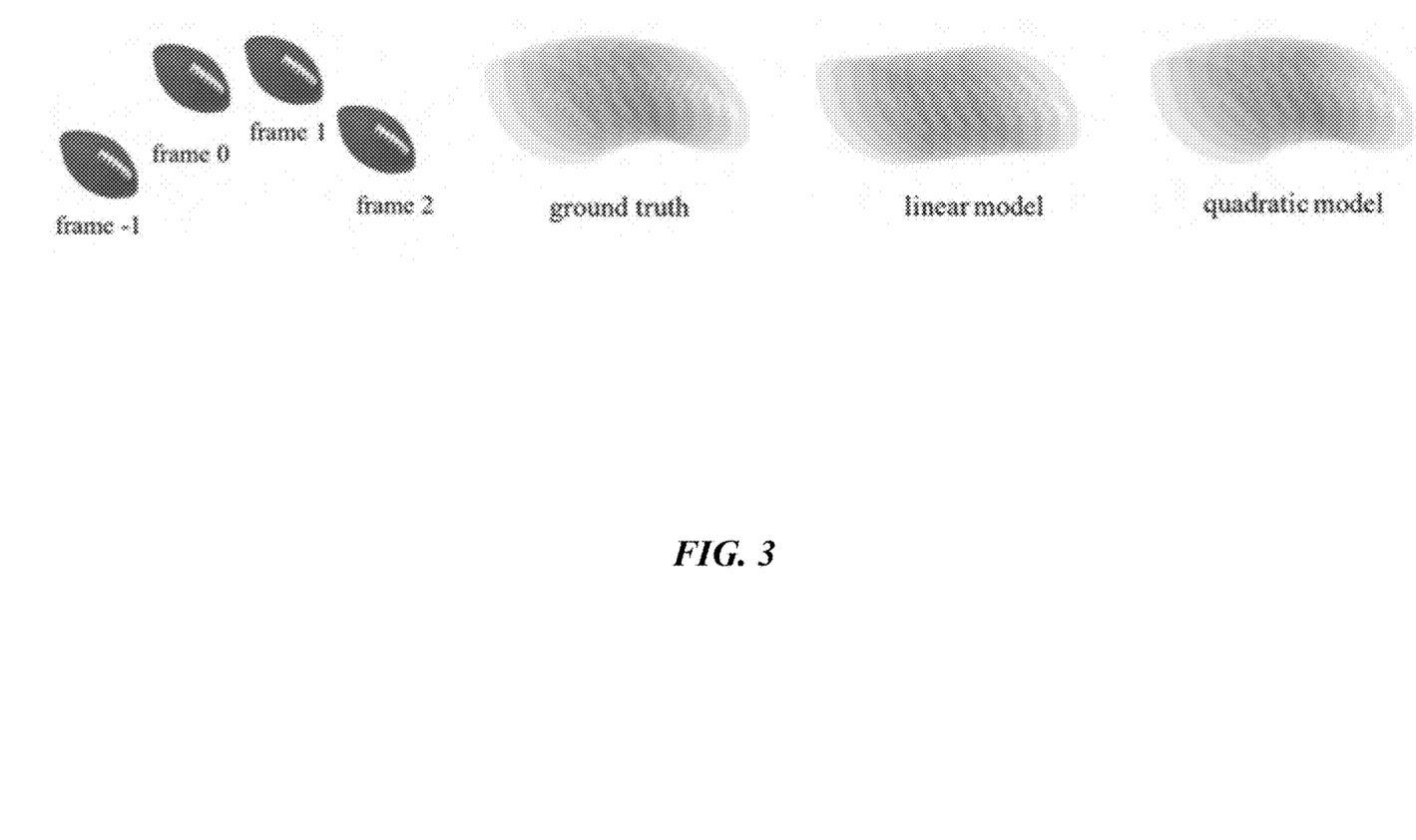
FIG. 3 illustrates example motion linearity.

In particular embodiments, the video interpolation algorithms may work based on the assumption of motion linearity. Linear or non-linear motion may influence the accuracy of location estimation. To enable non-linear motion estimation, the input window size should be more than 2 frames. Besides the motion linearity, the input windows size may also influence the context propagation for recursive modules. In particular embodiments, the receiver computer may use more than two different frames to reconstruct a frame as they may provide more information and context about the motion. With more frames, the receiver computer may reconstruct the motion in more accurate positions. FIG. 3 illustrates example motion linearity. As illustrated in FIG. 3, when changing the input from two frames to three or four frames, the reconstructions quantity greatly improves because of the motion non-linearity. In particular embodiments, such improvement may be for the feature alignment 235. The embodiments disclosed herein performed experiments to reveal the influence of motion linearity. The ZSM was chosen to compare the influence of motion linearity. The ZSM is a baseline space-time super-resolution method. The ZSM has a bidirectional deformable convolution-LSTM that propagates the whole sequence with both interpolated frames and ground-truth frames. Table 1 lists the results on the influence of motion linearity, measured by peak signal-to-noise ratio (PSNR) and structural similarity index (SSIM).

TABLE 1

Experimental results on influence of motion linearity.

| Number of input frames | Number of output frames | PSNR | SSIM |
| --- | --- | --- | --- |
| 2 | 1 | 35.57 | 0.9594 |
| 3 | 2 | 36.19 | 0.9634 |
| 4 | 3 | 36.33 | 0.9647 |

As may be observed from Table 1, when the number of input frames changed from 2 to 3, the PSNR increased by 0.62 and SSIM increased by 0.0040. When the number of input frames change from 3 to 4, the PSNR increased by 0.14 and SSIM increased by 0.013. The observations may indicate the motion linearity does influence the reconstruction accuracy. However, with the increasing of frame number, such improvements may become less and less.

The embodiments disclosed herein additionally performed experiments to reveal the influence of alignment. We swap the alignment module of the baseline module and compare the results: no-alignment, optical-flow based feature warping with SpyNet, cascaded deformable sampling, and flow-guided deformation alignment (FDA). Table 2 lists the results on the influence of alignment, measured by PSNR and SSIM.

TABLE 2

Experimental results on influence of alignment.

| Alignment | Parameters | Trainable params | PSNR | SSIM |
| --- | --- | --- | --- | --- |
| null | 1.7 million | 1.700 million | 31.94 | 0.9180 |
| SpyNet | 3.1 million | 1.700 million | 32.02 | 0.9308 |
| deformable | 2.5 million | 2.500 million | 32.45 | 0.9259 |
| FDA | 4.2 million | 2.800 million | 33.02 | 0.9381 |

As may be observed from Table 2, alignment modules improved the performance greatly, no matter implicit or explicit. Optical flow based methods retained more details, while deformable alignment was better in terms of PSNR. Combining optical flow and deformable sampling, flow-guided deformable alignment module showed solid improvement on the aligned results. Still, it greatly increased the model size.

The embodiments disclosed herein additionally performed experiments by swapping the optical flow estimator. In one experiment, we froze the parameters by either using optical flow for feature warping or switching the optical flow in flow-guided deformation alignment (FDA). Table 3 lists the results when using optical flow for feature warping. Table 4 lists the results when switching the optical flow in FDA.

TABLE 3

Experimental results when using optical flow for feature warping.

| Alignment | Parameters | Trainable parameters | PSNR | SSIM |
| --- | --- | --- | --- | --- |
| PWCNet | 9.5 million | 0.013 million | 29.60 | 0.8896 |
| SpyNet | 1.5 million | 0.013 million | 29.60 | 0.8897 |

TABLE 4

Experimental results when switching the optical flow in FDA.

| Alignment | Parameters | Trainable parameters | PSNR | SSIM |
| --- | --- | --- | --- | --- |
| FDA-PWCNet | 9.8 million | 0.397 million | 33.31 | 0.9436 |
| FDA-SpyNet | 1.8 million | 0.397 million | 33.61 | 0.9471 |

In another experiment, we make all parameters trainable. Table 5 lists the results when making all parameters trainable.

TABLE 5

Experimental results when making all parameters trainable.

| Alignment | Parameters | Trainable parameters | PSNR | SSIM |
| --- | --- | --- | --- | --- |
| SpyNet | 1.5 million | 1.5 million | 32.46 | 0.9257 |
| FDA-SpyNet | 1.8 million | 1.8 million | 34.85 | 0.9553 |

As observed from Table 3 to Table 5, SpyNet performed much better (+0.30 in PSNR) with the same number of trainable parameters, and had smaller overall model size. When making all parameters trainable, using optical flow only for feature warping, PSNR increased 2.86 and SSIM increased 0.063. When making all parameters trainable, using flow-guided warping, PNSR increased 1.24 and SSIM increased 0.0082.

The embodiments disclosed herein additionally performed experiments to reveal the influence of propagation. The experiment design is as follows. For bidirectional deformable Convolution-LSTM, it propagated the whole sequence with both interpolated frames with the ground-truth frames. For propagation in alignment, we made the alignment module accept forward and backward temporal information. The experimental results indicate that temporal propagation may be important. The results also indicate that we may not need duplicated propagation modules but rather should consider how to design the propagation along with the alignment for better synergy.

The embodiments disclosed herein further performed experiments to compare with the prior art. Table 6 lists the comparison with the prior art. The experiments are based on an experimental dataset for lower-level video processing. As may be seen, our model (either large size or small size) can achieve comparable or even better performance than the prior art, with only 10% to 50% parameters.

TABLE 6

Comparison with the prior art.

| Methods | Number of Parameters (Million) | Dataset for Lower-level Video Processing | |
|---|---|---|---|
| | | PSNR | SSIM |
| ZSM | 7.6 | 35.10 | 0.956 |
| DAIN | 24.0 | 33.35 | 0.945 |
| FLAVR | 42.1 | 32.22 | 0.929 |
| Our model (large) | 4.2 | 35.47 | 0.959 |
| Our model (small) | 1.8 | 34.85 | 0.955 |

Figure 4A:
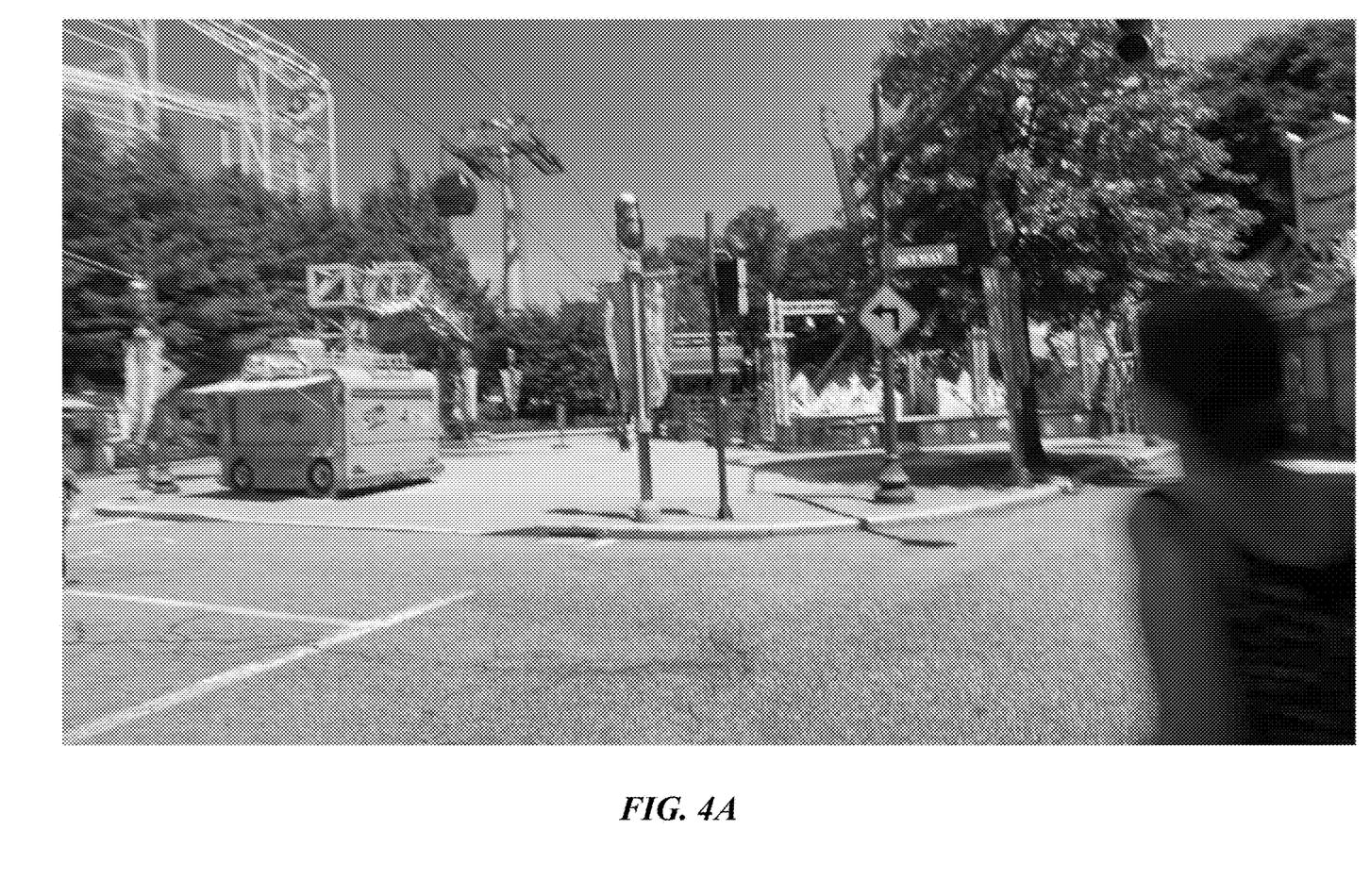
FIG. 4A illustrates an example video captured at low framerate.
Figure 4B:
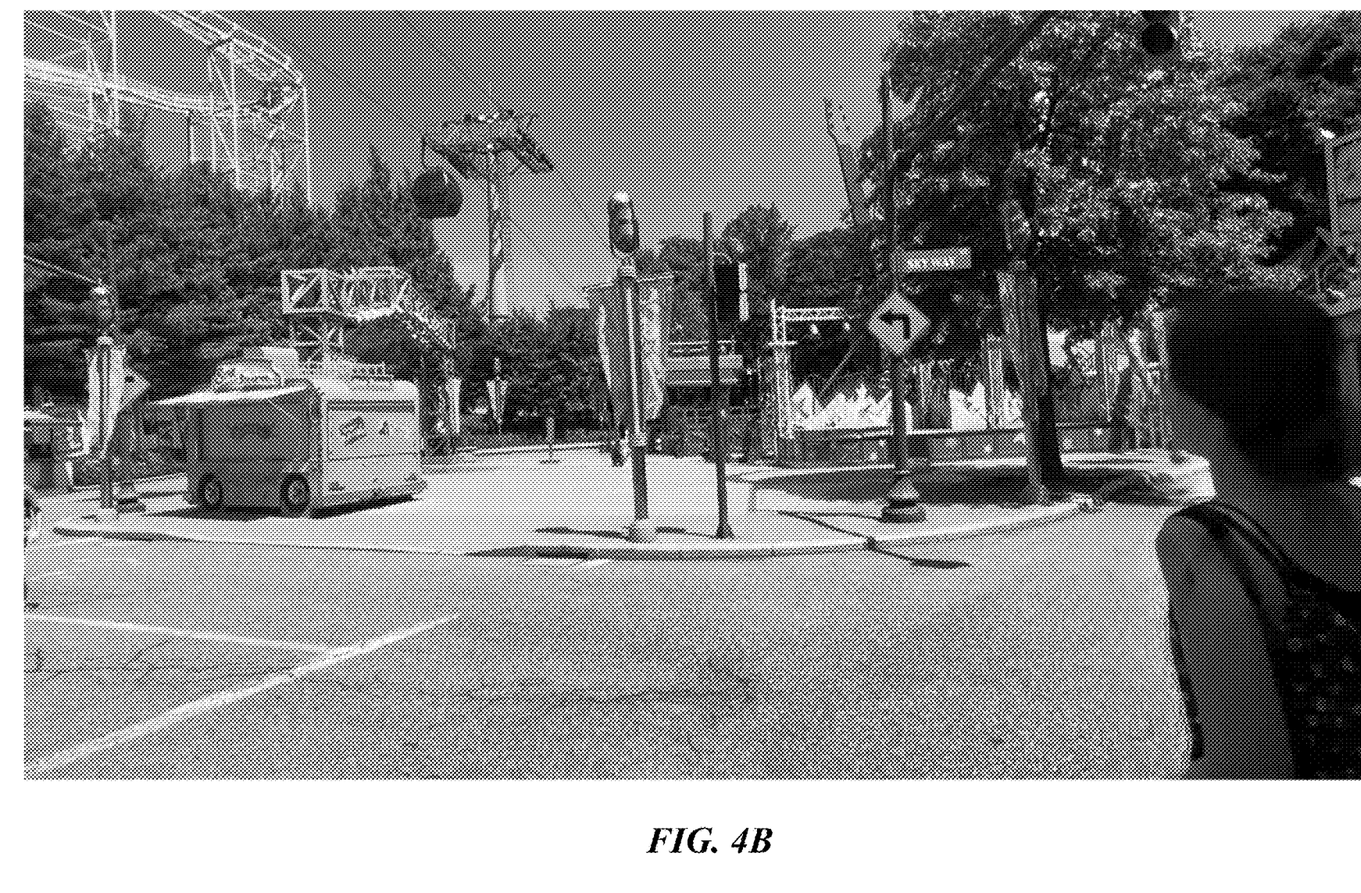
FIG. 4B illustrates an example reconstructed video with high framerate.

FIG. 4A illustrates an example video captured at low framerate. FIG. 4B illustrates an example reconstructed video with high framerate. As may be seen, the video in FIG. 4A is blurry due to the low framerate. After the reconstruction by the embodiments disclosed herein, the video has high framerate and looks much clearer.

The embodiments disclosed herein may be applied to a variety of use cases. In one use case, the embodiments may be applied to video streaming between a companion device (e.g., wearable device) and a rendering device. The companion device may be paired with the rendering device. In particular embodiments, the one or more cameras may be associated with the companion/wearable device. As an example and not by way of limitation, the companion/wearable device may be a smart watch, a VR headset, AR glasses, or smart glasses and the rendering device may be a computer, a smart phone, or a tablet. The companion device may capture ultra low-framerate video and transmit it to the rendering device, where the rendering device may reconstruct high-framerate video based on the embodiments disclosed herein. This may be important as the companion device may be compact device with limited battery, for which capturing ultra low-framerate video may save battery. In another use case, the embodiments may be applied to hologram calling wherein the camera on, e.g., VR glasses, may capture ultra low-framerate video and transmit it over the network. A server may then reconstruct the high-framerate video and render it to the participants in the call. In yet another use case, the embodiments may be applied to mobile calling, wherein a smartphone may capture ultra low-framerate video and transmit it over the network. A server may then reconstruct the high-framerate video and render it to the participants in the call.

Figure 5:
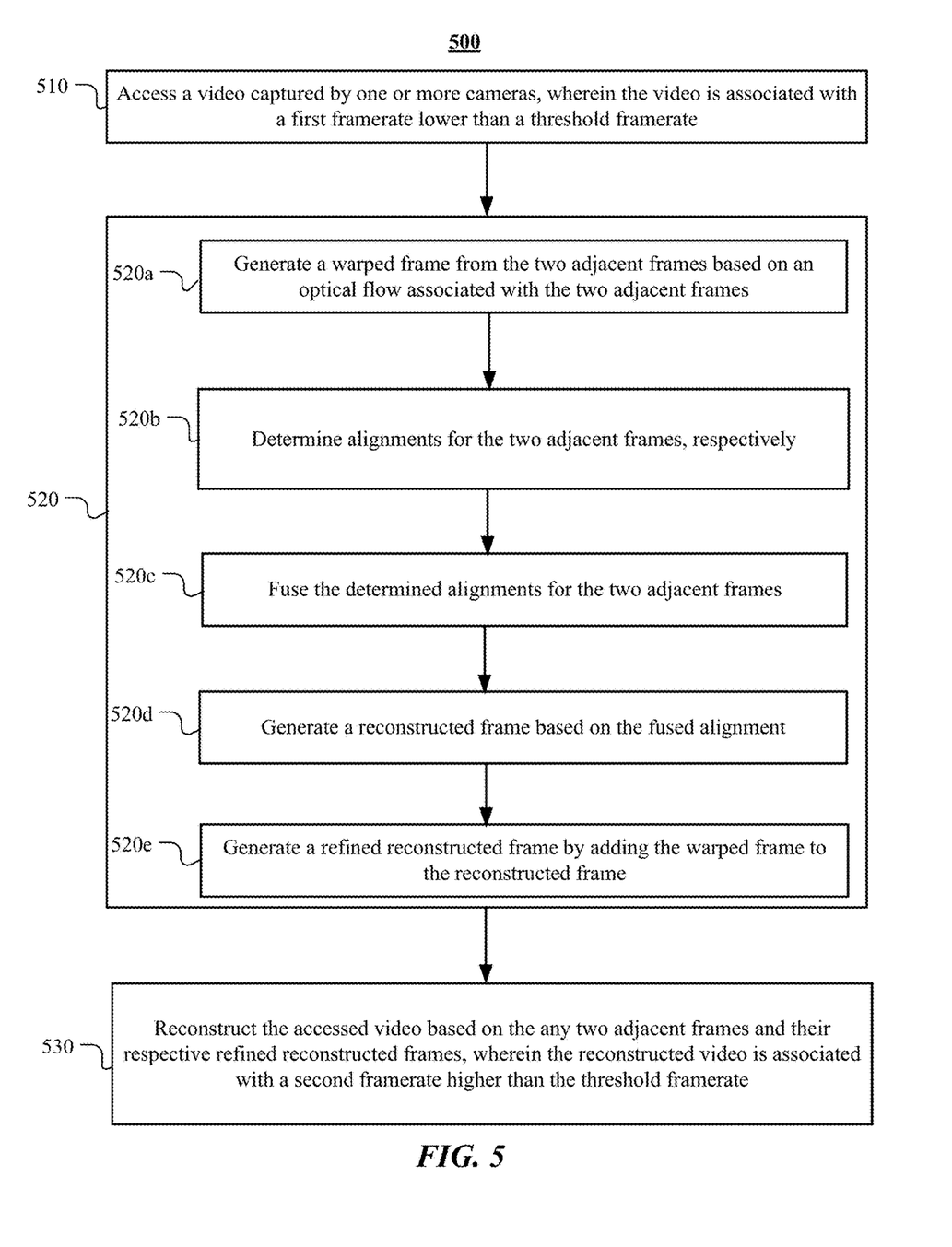
FIG. 5 illustrates an example method for video reconstruction.

FIG. 5 illustrates an example method 500 for video reconstruction. The method may begin at step 510, where the receiver computer may access a video captured by one or more cameras, wherein the video is associated with a first framerate lower than a threshold framerate. At step 520, the receiver computer may perform the following sub-steps for any two adjacent frames of the accessed video. At sub-step 520a, the receiver computer may generate a warped frame from the two adjacent frames based on an optical flow associated with the two adjacent frames. At sub-step 520b, the receiver computer may determine alignments for the two adjacent frames, respectively. At sub-step 520c, the receiver computer may fuse the determined alignments for the two adjacent frames. At sub-step 520d, the receiver computer may generate a reconstructed frame based on the fused alignment. At sub-step 520e, the receiver computer may generate a refined reconstructed frame by adding the warped frame to the reconstructed frame. At step 530, the receiver computer may reconstruct the accessed video based on the any two adjacent frames and their respective refined reconstructed frames, wherein the reconstructed video is associated with a second framerate higher than the threshold framerate. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for video reconstruction including the particular steps of the method of FIG. 5, this disclosure contemplates any suitable method for video reconstruction including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
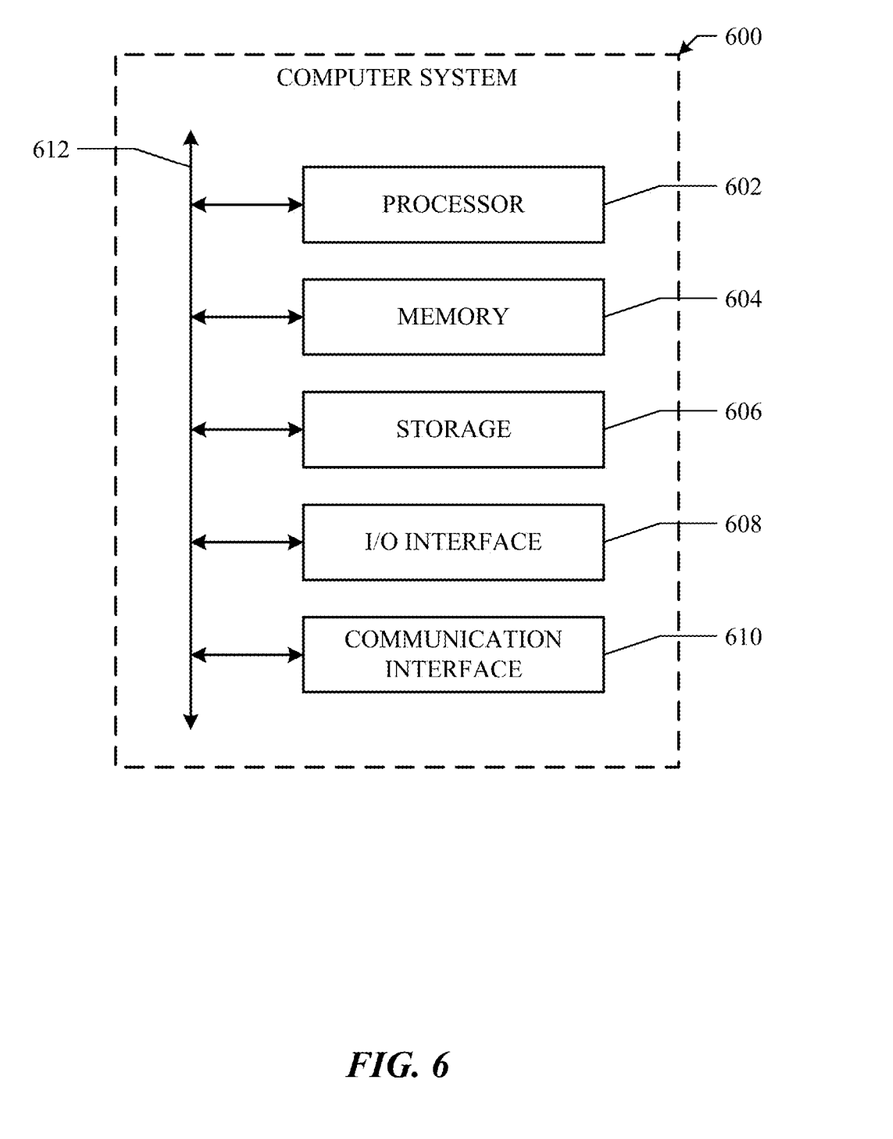
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
 accessing a video captured by one or more cameras, wherein the accessed video is associated with a first framerate lower than a threshold framerate;
 for any two adjacent frames of the accessed video:
  generating respective warped frames for each frame of the any two adjacent frames based on a respective optical flow associated with each frame of the any two adjacent frames;
  fusing the respective warped frames to generate an intermediate frame;
  determining respective alignments associated with each frame of the any two adjacent frames based on aligning each of the any two adjacent frames to the intermediate frame;
  fusing the respective determined alignments to generate residual information associated with the intermediate frame; and generating a reconstructed frame based on adding the intermediate frame with the residual information; and reconstructing the accessed video based on the any two adjacent frames and their respective reconstructed frame, wherein the reconstructed accessed video is associated with a second framerate higher than the threshold framerate.

2. The method of claim 1, wherein the accessing the video captured by the one or more cameras comprises: receiving, via a wireless network, the accessed video transmitted from the one or more cameras.

3. The method of claim 2, wherein the wireless network is associated with a bandwidth lower than a threshold bandwidth.

4. The method of claim 1, wherein the one or more cameras are associated with a wearable device.

5. The method of claim 1, further comprising: extracting respective features for the any two adjacent frames, wherein the respective alignments are determined based on the respective extracted features.

6. The method of claim 5, wherein the determining the respective alignments for each frame of the any two adjacent frames comprises, for each frame:
determining an offset field by concatenating the respective optical flow to the respective extracted features;
generating a refined offset field by adding the determined offset field to a flow field associated with the respective extracted features;
determining correspondences between the any two adjacent frames in a forward direction and a backward direction; and
convolving locations corresponding to the correspondences based on the refined offset field.

7. The method of claim 5, further comprising: generating, based on the respective extracted features for the any two adjacent frames by a warping algorithm, features associated with one or more reconstructed frames.

8. The method of claim 1, wherein:
the any two adjacent frames depict one or more moving objects,
the determining the respective alignments for the any two adjacent frames comprises:
determining one or more respective placements associated with the one or more moving objects in one or more reconstructed frames.

9. The method of claim 1, wherein:
the any two adjacent frames are associated with a first movement associated with the one or more cameras, and
the determining the respective alignments for the any two adjacent frames comprises:
determining a second movement associated with the one or more cameras, wherein the respective determined alignments are based on the second movement.

10. The method of claim 1, wherein the fusing the respective determined alignments for the any two adjacent frames is based on contextual information.

11. The method of claim 1, further comprising: adding an overlay associated with the any two adjacent frames to the reconstructed frame.

12. The method of claim 1, further comprising: adding one of the any two adjacent frames to the reconstructed frame.

13. The method of claim 1, wherein:
the any two adjacent frames comprise a first frame and a second frame,
the generating the respective warped frame comprises:
determining a forward optical flow from the first frame to the second frame and a backward optical flow from the second frame to the first frame;
determining an intermediate optical flow at a predetermined time interval;
determining, based on splatting, a first reverse optical flow from a reconstructed frame to the first frame and a second reverse optical flow from the second frame to the reconstructed frame; and
warping the first frame to the predetermined time interval based on the first reverse optical flow to generate a warped first frame and warping the second frame to the predetermined time interval based on the second reverse optical flow to generate a warped second frame; and
the fusing the respective warped frame comprises fusing the warped first frame and the warped second frame.

14. A non-transitory computer-readable medium storing instructions that, when executed, cause:
accessing a video captured by one or more cameras, wherein the accessed video is associated with a first framerate lower than a threshold framerate;
for any two adjacent frames of the accessed video:
generating respective warped frames for each frame of the any two adjacent frames based on a respective optical flow associated with each frame of the any two adjacent frames;
fusing the respective warped frames to generate an intermediate frame;
determining respective alignments associated with each frame of the any two adjacent frames based on aligning each of the any two adjacent frames to the intermediate frame;
fusing the respective determined alignments to generate residual information associated with the intermediate frame; and
generating a reconstructed frame based on adding the intermediate frame with the residual information; and
reconstructing the accessed video based on the any two adjacent frames and their respective reconstructed frame, wherein the reconstructed accessed video is associated with a second framerate higher than the threshold framerate.

15. The computer-readable medium of claim 14, wherein the accessing the video captured by the one or more cameras comprises: receiving, via a wireless network, the accessed video transmitted from the one or more cameras.

16. The computer-readable medium of claim 15, wherein the wireless network is associated with a bandwidth lower than a threshold bandwidth.

17. The computer-readable medium of claim 14, wherein the one or more cameras are associated with a wearable device.

18. The computer-readable medium of claim 14, wherein:
the instructions, when executed, further cause: extracting respective features for each frame of the any two adjacent frames, and
the respective alignments are determined based on the respective extracted features.

19. A system comprising:
one or more processors; and
a non-transitory memory coupled to the one or more processors comprising instructions executable by the one or more processors, the one or more processors operable when executing the instructions to:

access a video captured by one or more cameras, wherein the accessed video is associated with a first framerate lower than a threshold framerate;

for any two adjacent frames of the accessed video:
  generate respective warped frames for each frame of the any two adjacent frames based on a respective optical flow associated with each frame of the any two adjacent frames;
  fuse the respective warped frames to generate an intermediate frame;
  determine respective alignments associated with each frame of the any two adjacent frames based on aligning each of the any two adjacent frames to the intermediate frame;
  fuse the respective determined alignments to generate residual information associated with the intermediate frame; and
  generate a reconstructed frame based on adding the intermediate frame with the residual information; and reconstruct the accessed video based on the any two adjacent frames and their respective reconstructed frames, wherein the reconstructed accessed video is associated with a second framerate higher than the threshold framerate.

\* \* \* \* \*